G. W. MILTIMORE.
Car-Axles.
No. 144,347.                        Patented Nov. 4, 1873.
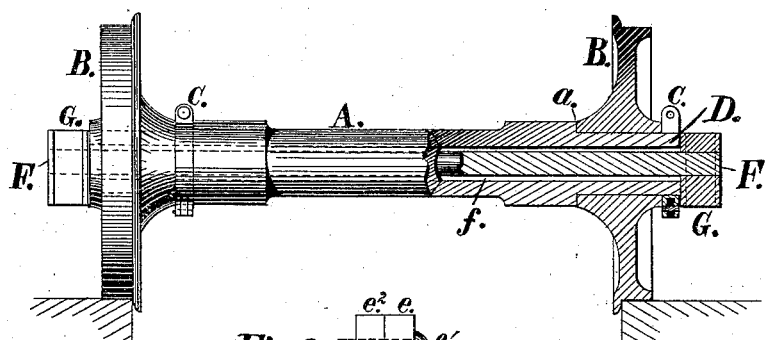
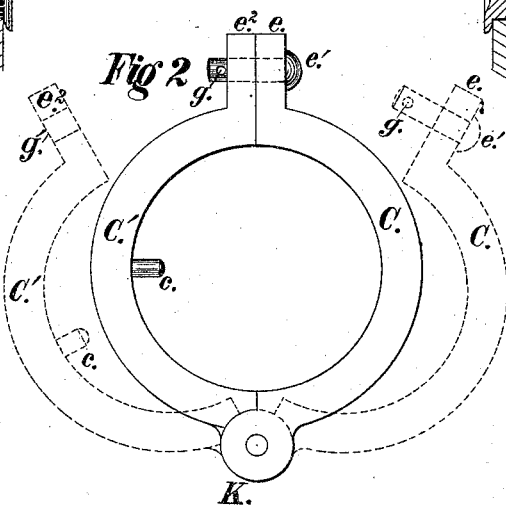

UNITED STATES PATENT OFFICE.

GEORGE W. MILTIMORE, OF JANESVILLE, WISCONSIN.

IMPROVEMENT IN CAR-AXLES.

Specification forming part of Letters Patent No. 144,347, dated November 4, 1873; application filed October 6, 1873.

*To all whom it may concern:*

Be it known that I, GEORGE W. MILTIMORE, of Janesville, county of Rock and State of Wisconsin, have invented certain Improvements in Railroad-Car Axles, of which the following is a specification:

My invention, hereinafter more fully described, has been made upon, and is to be used in connection with, a car-axle, the general construction of which is as follows:

The main axle is a straight round rod of metal, and that is inclosed in a hollow cylinder or sleeve; and upon the ends of that sleeve journals are provided for the wheels, and such journals are provided with square shoulders, against which the inner ends of the hubs of the wheels abut, while the outer ends of such hubs abut against bearing-blocks fastened upon each end of the main axle. These blocks prevent the outward spread of the wheels, and sustain the car; and the general result of this construction is, that the sleeve and wheels revolve upon the main axle as a solid piece, except that when the peripheries of the wheels become equal, or when, in turning a curve, it becomes necessary that their speed of revolution should be unequal, then the smaller wheel, or the one having to make greater speed than its fellow, will revolve upon its journal upon the sleeve, and thus any slipping or grinding action will be prevented.

Now, my said invention relates to the construction and arrangement of a ring, collar, or clamp, capable of being opened and closed, which may be placed upon and inclose the journal upon the sleeve, either between the shoulder of the journal and the inner face of the wheel, or between the bearing-block and the outer face thereof, for the purpose of increasing or diminishing the distance between the wheels, as required, in running over roads of different gages.

In the accompanying drawings, in Figure 1, on the left, is represented a simple elevation of a wheel, a portion of the sleeve and main axle in proper position; and on the right, a vertical central sectional view of the other wheel, the other end of the sleeve and axle, with its bearing-block and collar, illustrating my said improvement. In Fig. 2 is represented, in detail, an enlarged end view of the ring, collar, or clamp which is the subject of this my invention.

B B indicate the wheels; A, the sleeve; F, the main axle; G G, the bearing-blocks; $a\,a$, the shoulders of the journals upon the sleeve; C, the clamp or collar; K, the hinge of the same; $e$ and $e^2$, the flanges by means of which it is fastened when closed; $e^1$, the bolt, and $g$ the pin to keep the bolt from working out; and $c$ is a lug to be inserted into the journal of the sleeve to prevent the clamp from revolving. This lug $c$ and the devices for keeping the ring closed are of minor importance, and no claim is made herein for them. The collars or clamps may be as many in number, and each may occupy as much or as little space on the journal of the sleeve by reason of its width, as convenience may require. By reason of its opening upon its hinge, it may be taken off with great facility; and by reason of its use, the car-truck can be speedily changed for a wider or narrower gage of road with but little force or expense.

To make the change for a narrower gage, one or more collars (according to their width) may be removed from the inner sides of the wheels; and the two roads being connected—two rails converging from one to the other—by moving the car forward, the wheels will adjust themselves inwardly, and then the collars may be placed outside of them, to confine them in position; but to make the change for a wider gage, the rings should be taken from the outer sides of the wheels, the two roads connected by diverging rails, and guide-rails laid to act upon the flanges; and then, by moving the car forward, the wheels will adjust themselves outwardly to the wider gage, and will be confined to it by placing the collars inside the wheels.

What I claim as my invention is—

In combination with the sleeve A and bearing-block G, the collar C, constructed to operate substantially as and for the purpose set forth.

G. W. MILTIMORE.

Witnesses present:
HENRY C. TITUS,
A. M. STOUT.